(12) United States Patent
Markow

(10) Patent No.: US 6,304,434 B1
(45) Date of Patent: Oct. 16, 2001

(54) PORTABLE COMPUTER WITH BOTH DYNAMIC AND PIEZOELECTRIC TRANSDUCERS

(75) Inventor: Mitchell A. Markow, Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/086,301

(22) Filed: May 28, 1998

(51) Int. Cl.[7] ............................... H05K 5/02; G06F 1/16
(52) U.S. Cl. .................... 361/683; 361/680; 361/686; 361/625; 381/333; 312/223.1; 312/223.2
(58) Field of Search .................. 36/680–686, 625; 381/87, 388, 333; 312/223.1, 223.2, 827; 181/141, 150, 199

(56) References Cited

U.S. PATENT DOCUMENTS 5,638,456 * 6/1997 Conley et al. .................. 381/190
5,682,290 * 10/1997 Markow et al. .................. 361/683
5,828,768 * 10/1998 Eatwell et al. .................. 381/333
6,040,978 * 3/2000 Spencer .................. 361/683
6,148,243 * 11/2000 Ishii et al. .................. 700/94
6,181,550 * 1/2001 Kim .................. 361/683

OTHER PUBLICATIONS

Dimitriadis et al., "Piezoelectric Actuators for Distributed Vibration Excitation of Thin Plates," Journal of Vibration and Acoustics, vol. 113, Jan. 1991, pp. 100–107.
Sonti et al., "Equivalent Forces and Wavenumber Spectra of Shaped Piezoelectric Actuators," Journal of Sound and Vibration, 1995, 187, pp. 111–130.
"Quickpack Peizooelectric Actuators," ACX(Active Control eXperts, Inc.) Nov. 1996, 12 pages.

* cited by examiner

Primary Examiner—Leo P. Picard
Assistant Examiner—David Foster
(74) Attorney, Agent, or Firm—Conley, Rose & Tayon, P.C.

(57) ABSTRACT

A method for improving spatial impression in a four-speaker system using dynamic and piezo transducers. The use of a piezo transducer eliminates the need for a low-pass filter.

35 Claims, 3 Drawing Sheets

PORTABLE COMPUTER WITH BOTH DYNAMIC AND PIEZOELECTRIC TRANSDUCERS

BACKGROUND AND SUMMARY OF THE INVENTION

The present application relates to portable computers and their speaker systems.

Background: Computer-Based Audio

The production of quality sound with computers has advanced significantly in recent years. Early personal computers typically had nothing more than a single, small speaker used to produce a beep or series of single-frequency beeps to indicate system status upon startup. However, consumers demanded more. With the significant advances in circuit miniaturization, improved sound quality electronics has been available for desktop systems for some time, and is now moving into the portable computer systems arena.

Today, there is a multimedia explosion that is adding a significant new dimension to the way people use computers. One of the biggest advantages is 16-bit, CD-quality sound. With the right speakers, this sound can be as impressive as the sound on a normal consumer's stereo system. More and more, computer applications include the capability to use and capture the full impact of 16-bit sound for multimedia. MIDI musical compositions become more inspiring, games more suspenseful, software more dramatic, and radio and television programs (obtained through the computer) can equal the quality of conventional reception systems.

In addition, computer and audio technologies are revolutionizing business. For example, in video conferencing, voices are reproduced with a natural quality that makes them seem as if the speaker were in the room. Providing a high-quality audio background during presentations greatly enhances their effectiveness, and portable computers provide the greatest opportunity for meeting this need. Furthermore, the work environment is becoming ever more mobile with employees traveling more, and perhaps even telecommuting (working from home). Use of increased travel time translates to work environments with higher ambient noise, such as airports, trains, or mass transit systems. Another factor in this trend is the user's need for more effective methods for communicating with potential customers, or even with the office when away on business.

Background: Spatial Impression

The design of sound reproduction systems is not only based on considerations of electrical and acoustical engineering and physics, but also requires knowledge of psychoacoustics, i.e. how sound is perceived by listeners.

One of the parameters of psychoacoustics is spatial impression. When a sound is generated in a room, the listener will first hear the sound via the direct path from the source. Shortly thereafter, the listener will hear the reflections of the sound off surfaces such as walls or ceilings. Human listeners will assess the size of the space they are in by listening to laterally reflected sound which accompanies a sound signal. Thus, in a loudspeaker system it is desirable to have some sound transmission paths which reach the ears of the listener with a certain amount of delay (e.g. 10–60 milliseconds) as compared with the direct transmission path. (This will give the impression of a spacious listening room by broadening the soundstage, and also by giving the illusion of pushing the sound beyond the physical location of the speakers, even if the listener is listening in a room which is very small.) Moreover, another peculiarity of this psychoacoustic parameter is that the low frequencies (below 500 Hz) dominate spatial impression. A more roomy spatial impression is welcome to many listeners. However, it is not easy to do this with a small speaker system, and particularly not with a small portable computer's speaker system.

To increase spatial impression, the ratio of laterally reflected energy to directly transmitted energy can be increased: the higher this ratio, the greater the spatial impression. (An extreme case of this is found in a symphony concert hall, where there is almost no direct sound.)

Whether the user is video-conferencing, playing a game, or just working with music in the background, spatial impression plays an important role in the computing experience. That role is growing ever more important as multimedia makes its way into even the most uncompromising of business applications.

Further background regarding spatial impression can be found in: J. Blauert, SPATIAL HEARING (2.ed. 1996); and in M. Barron, "Effects of Early Reflections on Subjective Acoustic Quality in Concert Halls" (thesis, University of Southampton, 1974); both of which are hereby incorporated by reference.

Background: Stereophonic and Surround Sound

Since its introduction in the 1950's, stereo has been regarded as an essential minimum requirement of quality sound reproduction. Stereo can convey a traditional soundstage in which the sound comes from the front, such as when one attends a play or concert. However, even stereo has shortcomings when required to convey the ambiance where the sound is heard from all around the listener. Stereo's lack of spatiality undermines sonic realism in, for example, a game where aircraft fly overhead from front to back, or footsteps come from off to the side. For this reason various "surround sound" schemes have been used, to provide at least some speaker output behind the listeners' positions.

Background: Portable Computer Audio Limitations

Two driving constraints on the development of portable computers are volume and power consumption. The form factor of portable computers cannot be expanded, so that volume is a key resource. Additional functions are continually sought to be added, and many of these place new demands on available volume. Moreover, as larger display sizes become available they require more area in the lid, and hence consume more volume. Similarly, users continually demand more battery lifetime, which implies a continuous struggle to minimize power consumption.

These two constraints bind especially tightly in the case of speakers: the low-frequency power-efficiency of a speaker is directly affected by its volume. Since low-frequency response is a significant limitation of portable speaker systems, this is a difficult constraint. Some attempts have been made to use external speakers with portable computers, but this is cumbersome.

As of 1997, the internal sound systems typically sold with portable computers produce marginal sound quality at best. Most multimedia computers sold today include a stereo sound card which is capable of reasonably good sound reproduction. However, the internal speakers are typically small and produce tinny sound with inadequate bass. As a result, millions of multimedia computer users suffer very poor sound fidelity from their computers.

However, poor sound quality in portable computers is undesirable. The experience of a game or multimedia presentation, with sound and video animation, can be astonishingly real when coupled with quality audio. Quality sound can make a significant difference in the enjoyment the user can get from a multimedia computer. Music while working is more enjoyable, training and "edutainment" titles are richer, and games become much more realistic and exciting.

Background: Dynamic Speakers

One simple way to generate the air motion in a speaker is with a dynamic transducer. This is basically a very simple linear motor, in which a moving diaphragm is attached to a coil which is driven by a variable current. The coil is suspended in a constant magnetic field. The current through the coil interacts with the magnetic field to generate a force, which makes the coil and diaphragm oscillate according to the current variations through the coil.

Background: Piezoelectric Speakers

A piezoelectric material is one which changes shape in response to an applied electric field. Piezoelectric ("piezo") speakers use piezoelectric materials to generate physical motion in response to applied voltage. This physical motion typically has high force available, but operates over only a very short distance, so this is (mechanically) a high-impedance transducer. Thus the piezoelectric element is usually connected to a plate of some sort, and the motion of the plate provides most of the moving area of the speaker.

Such speakers typically are thin polymer sheets (of a piezoelectric polymer such as "PVDF") or disks of a piezoelectric ceramic. Such speakers can be made very thin; unlike diaphragm-type conventional speakers, piezo speakers need essentially no room for magnet and voice coil excursion requirements. More recently, ACX (Active Control Experts, Inc.) has manufactured packaged piezo speakers which take into consideration the problems encountered when working with piezo technology. These problems include breakage, attachment of leads, and electrical and mechanical isolation. The packaged model may now comprise polyimide coatings, pre-attached electrical leads, structural protection for the brittle piezo ceramics, and protection to the user (from high voltages associated with the use of piezos) as well as to the speaker from harsh working environments.

The convenient small form factor of piezo speakers is especially convenient for mounting in the lid of a portable computer. In such a configuration, the plastic back surface of the lid provides the moving area of the transducer. Thus the volume of the lid can be substantially dedicated to the display screen itself, and the piezo speakers can be mounted somewhere out of view.

However, piezo speakers are typically used only for midrange and high frequencies. This is because the low-frequency range of piezo speakers is typically limited by excursion limitations. (That is, the speaker plate moves in and out only a short distance.)

Enhancement of Audio Spatial Impression in a Portable Computer Using Dynamic and Piezoelectric Transducers The present application discloses new techniques for implementing a system with four (or more) speakers, using dynamic and piezoelectric ("piezo") transducers. (Piezo devices are typically high frequency in nature.) If unequalized, these piezo drivers will roll off around 400–500 Hz. However, with equalization they can provide a good output power down to about 250 Hz (depending on the size of the baffle).

A particular advantage of piezoelectric speakers is that they can be placed wherever desired. For example, the middle of the back of the display lid of a portable computer is a particularly advantageous place to locate piezoelectric drivers. However, the speakers may be moved to any location in the back of the display to provide the desired effect. The high dynamic forces of piezo speakers will actually move the surface of the panel lid. Of the various modes of the panel lid, it is of course preferable to drive the modes which are "air-pumping" modes, i.e., which provide good acoustic emission, as compared to non-air-pumping.

The advantages of this piezoelectric configuration include:

1. greater front-back image depth;
2. added spatial enhancement;
3. a surround sound effect from the multiple echoes; and
4. overall system constraints are significantly reduced due to the thickness of the piezo.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Speaker Layout in a Portable Computer

Figure 1:
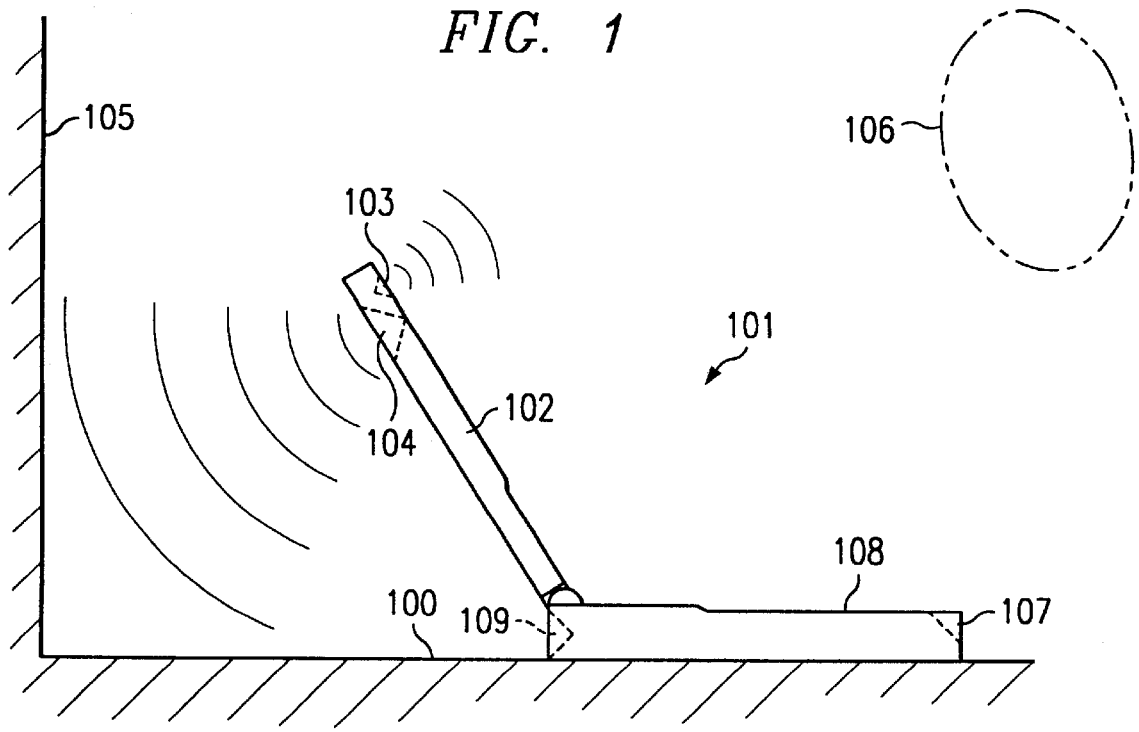
FIG. 1 shows a diagram of a portable computer in the preferred embodiment.

FIG. 1 shows a diagram of a portable computer in the preferred embodiment. A portable computer 101 is positioned on a surface 100 with display 102 in proper viewing position, and comprising two sets of speakers. A pair of speakers 104 is mounted in the back of the display 102 for back-firing sound onto reflective surfaces 105 and 100 back to the volume 106 where the listener may be located. The packaged piezo speaker may, for example, have a thickness of approximately 0.010 inch, with the uncoated piezo itself being approximately 0.007 inch thick. The coating may be a polyester or a polyimide. A pair of speakers may, for example, be packaged as a monolithic speaker assembly. The speakers 104 need not be at the corners, but may also be located anywhere in the back of the display lid that provides the desired result. Optionally, a second pair of speakers 103 may be mounted on the forward-facing side of the display 102 to assist with mono localization, and provide a direct sound path to the listener located in the volume 106 seated in front of the computer 101. Alternatively, the forward-firing speakers may be mounted on the front of the chassis 108 of the computer 101 at location 107, and/or the rear-firing speakers may be mounted in the rear of the chassis 108 at location 109. The angle of the speakers as mounted in the display lid 102 should direct sound in the horizontal plane to obtain wall and surface reflections. While the display 102 is usually capable of pivoting approximately 120 degrees from the base section, any angle of pivot could be used, such as 90 degrees from the base section. It is undesirable to have the speakers firing directly back into a wall. Furthermore, it is preferable to have a speaker frequency response less than 500 Hz. (Too much acoustical energy in the mid-band range of approximately 800–2000 Hz shifts the image too far back from the listener.) A polar pattern with a narrower non-voiceband pattern causes less image shift.

Figure 4:
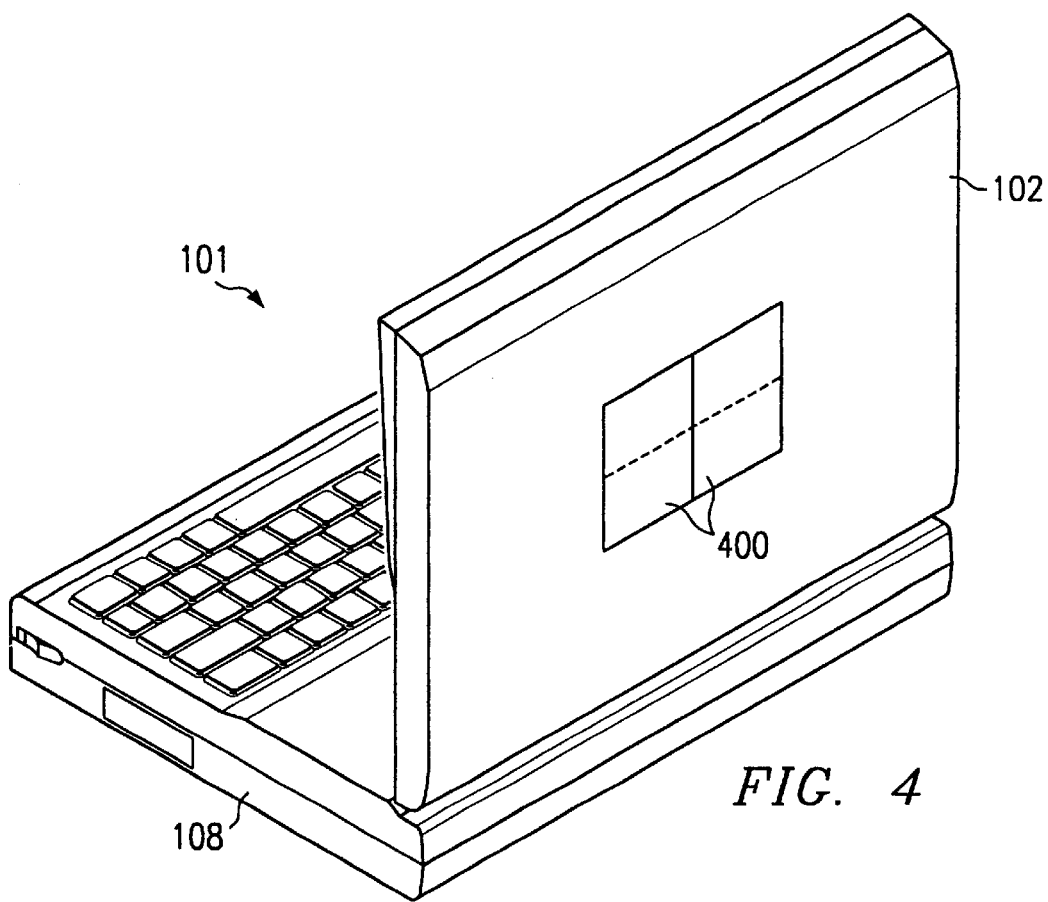
FIG. 4 shows how the portable computer of FIGS. 1 and 2 can be implemented with speakers mounted in the display lid.
Figure 2:
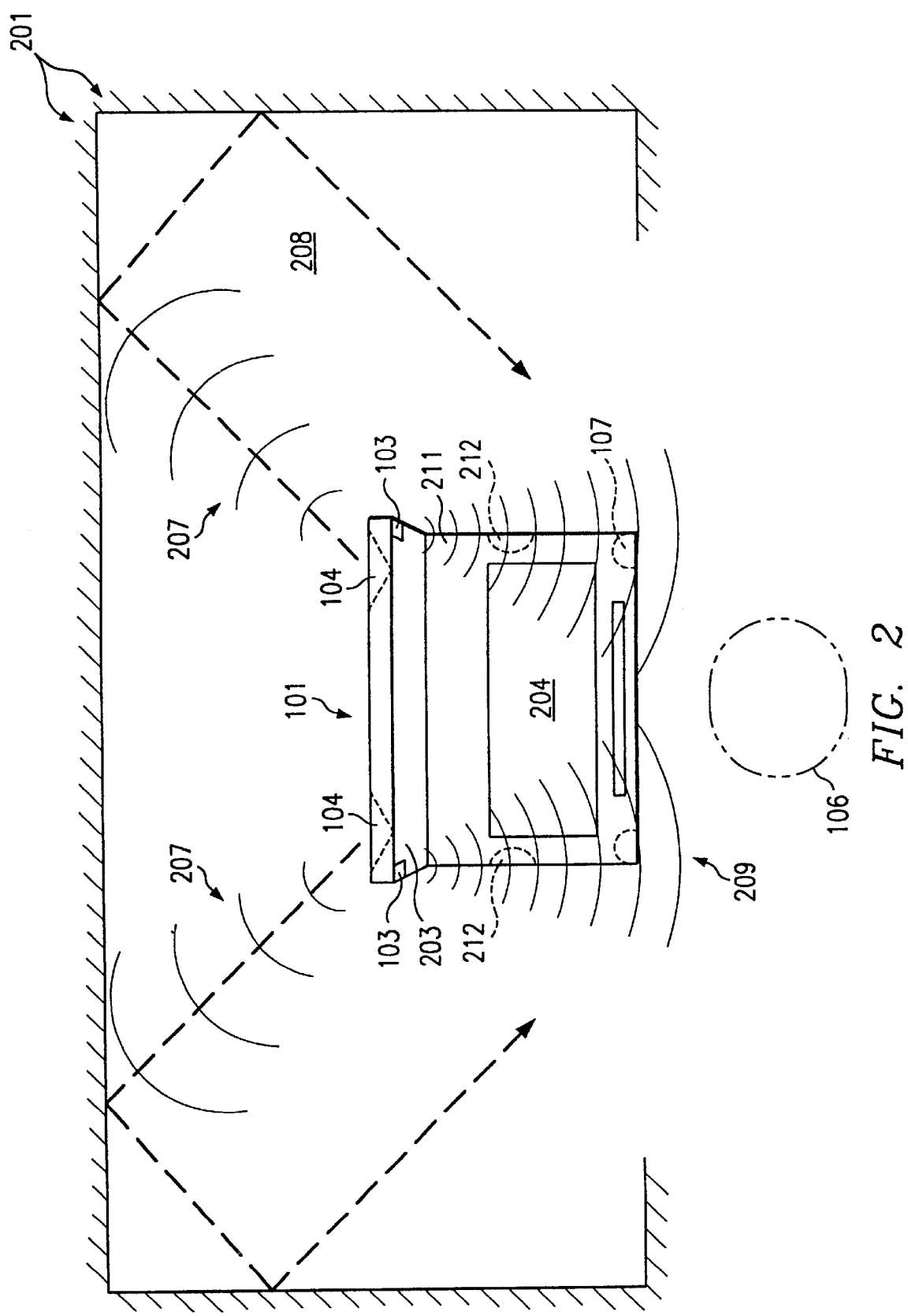
FIG. 2 shows a top-down view of reflected sound from a speaker system mounted into the display of a portable computer.

FIG. 4 shows how the portable computer of FIGS. 1 and 2 can be implemented with piezoelectric drivers mounted in the display lid. A portable computer 101 with a chassis 108 has an attached display 102. Piezo drivers 400 may be mounted anywhere in the rear of the display lid to take advantage of space available in the display, and to use the display lid as a vibrating panel. (That is, the piezo drivers themselves provide a high force over a short distance, and thus the bare piezo driver would not have a good acoustic impedance to air at frequencies below voiceband. However, by mechanically coupling the piezo driver to the plastic panel in the back of the display lid, the volume of air moved by each cycle of the piezo driver is greatly increased.) In the presently preferred embodiment, these piezo drivers are encapsulated ceramic drivers from ACX, as described above. With the piezo speakers mounted in the back panel of the display shell, they can be mounted in such a fashion as to direct the sound pressure away from a user to increase stereo separation and spatial impression.

Thus in this configuration the plastic back panel of the display lid provides the plate which is driven by the piezoelectric element. Equalization is used, as is conventional, to prevent the plate resonance frequencies from distorting the spectrum of the audio signal.

Reflected Sound Path

FIG. 2 shows a top-down view of reflected sound path from a speaker system mounted in the display lid of a portable computer. The computer is positioned on a surface 208 with display lid 203 open for viewing by the listener. When a listener is seated approximately in front of the computer 101, for use of the computer keyboard 204 and display 203, the listener's head can be expected to be located in the volume 106. Speakers 104 mounted on the back of the display 203 provide rear-firing sound waves 207 which are reflected (in this example) off of vertical surfaces 201 and horizontal surface 208, back to the listener. (The surfaces 201 and 208 are part of the user's work environment, so their position is not known a priori.) Optionally, speakers 103 mounted on the front of the display 203 provide direct-path audio to the listener. The front-mounted speakers improve sound quality, but add cost. The combination of the reflected sound waves 207 and the direct sound waves 209 provides improved spatial impression to the listener.

Alternatively, the forward-firing speakers 103 may be mounted in a front location 107 of the chassis 211 of the computer 101.

In a further alternative, speakers may be mounted at a side location 212, instead of or in addition to the rear-firing speakers, to enhance lateral reflections.

Portable Computer System

Figure 3:
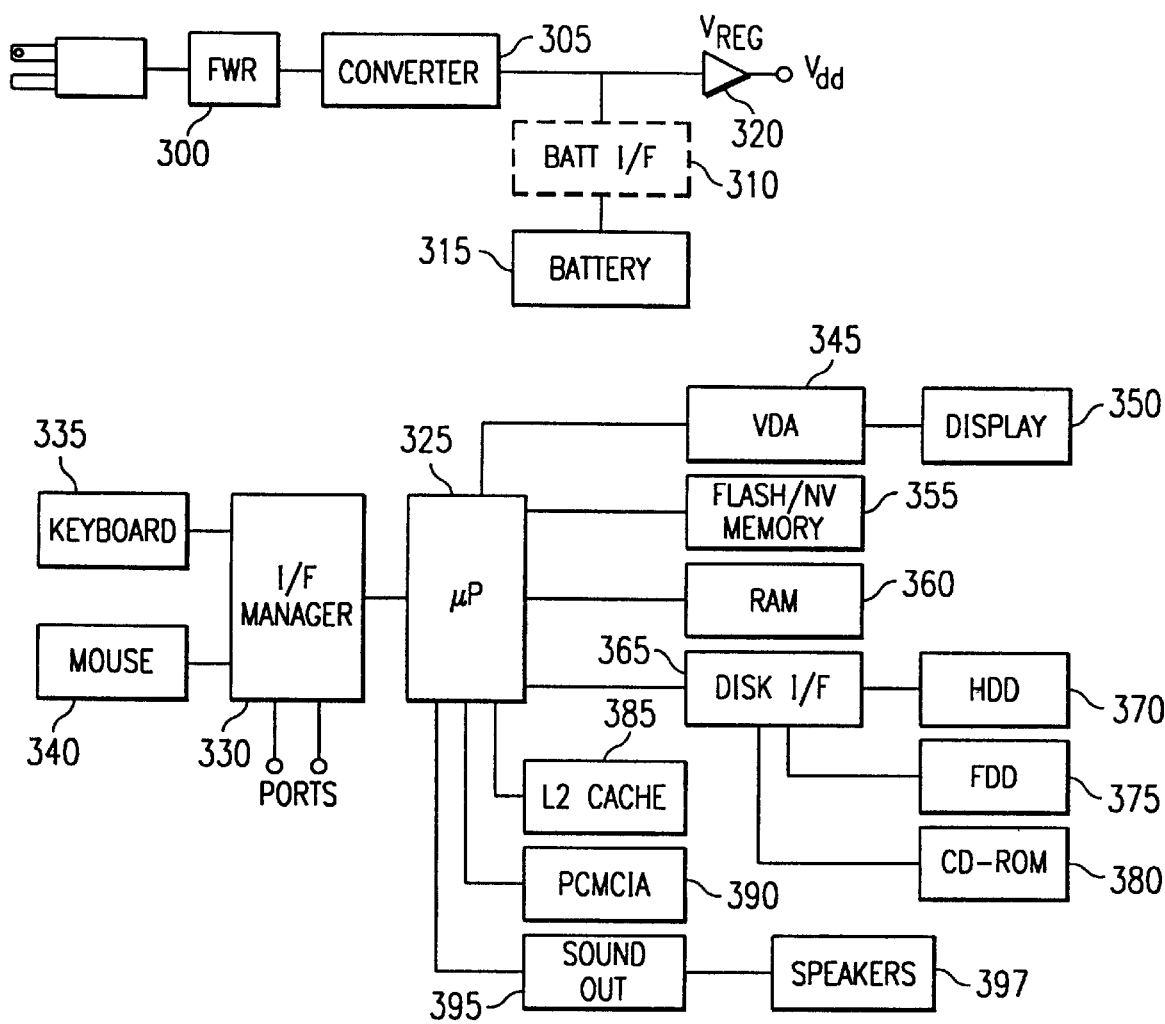
FIG. 3 shows a block diagram of a portable computer system according to the presently preferred embodiment.

FIG. 3 shows a block diagram of a portable computer system according to the presently preferred embodiment. The system includes a power converter 305 which is used to charge a battery 315. Optionally, a battery interface 310 is interposed between the battery and the rest of the circuitry. The power converter 305 is connected, through a full-wave bridge rectifier, 300, to draw power from AC mains, and is connected to provide a DC voltage to the battery 315. The battery 315 (or the converter 305), connected through a voltage regulator 320, is able to power the complete portable computer system, which includes in this example:

user input devices (e.g. keyboard 335 and mouse 340);

at least one microprocessor 325 which is operatively connected to receive inputs from said input device, through an interface manager chip 330 (which also provides an interface to the various ports);

a memory (e.g. flash or non-volatile memory 355 and RAM 360), which is accessible by the microprocessor;

a data output device (e.g. display 350 and video display adapter card 345) which is connected to output data generated by the microprocessor 325;

a magnetic disk drive 370 which is read-write accessible, through an interface unit 365, by the microprocessor 325: and a sound system comprising a sound circuit 395 driving a speaker system 397.

Optionally, of course, many other components can be included, and this configuration is not definitive by any means. For example, the portable computer may also include a CD-ROM drive 380 and floppy disk drive ("FDD") 375 which may interface to the disk interface controller 365. Additionally, L2 cache 385 may be added to speed data access from the disk drives to the microprocessor, and a PCMCIA 390 slot accommodates peripheral enhancements.

Alternative Embodiment: Side-Firing Speakers

According to a disclosed class of innovative embodiments, the innovative methods are not restricted to rear-firing speakers, but may also be realized with side-firing speakers to enhance lateral reflections.

Alternative Embodiment: Spectrum Customization

According to a disclosed class of innovative embodiments, the innovative method can be implemented to customize spatial impression for the occasion. For example, if making presentations to an audience, the user may desire to use only the rear-firing speakers, and cut off the forward-firing speakers. On the other hand, the user may desire to cut off the rear-firing speakers in a more quiet environment.

Alternative Embodiment: Four Piezo Transducers

According to a disclosed class of innovative embodiments, more piezo speakers (e.g. four) can be used on the back of the display panel, to increase the output and/or modify spectral response.

According to a disclosed class of innovative embodiments, there is provided: A portable computer system, comprising: an input device, a microprocessor which is operatively connected to detect inputs from said input device, random-access memory which is connected to be read/write accessible by said microprocessor, an output device operatively connected to receive outputs from said microprocessor, and a display connected to display information toward a user position; first speakers which radiate acoustic energy toward said user position; and one or more piezoelectric speakers which radiate acoustic energy away from said user position; whereby spatial impression is enhanced.

According to another disclosed class of innovative embodiments, there is provided: A portable computer system, comprising: an input device, a microprocessor which is operatively connected to detect inputs from said input device, random-access memory which is connected to be read/write accessible by said microprocessor, and an output device operatively connected to receive outputs from said microprocessor; a movable display, operatively connected to display data generated by said microprocessor; one or more rearward-firing piezoelectric speakers, which radiate acoustic energy toward the rear side of said display; and a plurality of forward-firing dynamic speakers which radiate acoustic energy toward the front of said display; wherein energy generated from said rearward-firing speakers is delayed in time with respect to energy generated from said forward-firing speakers; wherein the spectral content of said acoustic energy is predominantly below a certain frequency in order to enhance spatial impression.

According to another disclosed class of innovative embodiments, there is provided: A method of enhancing spatial impression in a portable computer audio sound system, comprising the steps of: (a.) driving a first set of rearward-firing piezoelectric speakers, which are integral with said computer, to project acoustic power away from the rear of a planar display, to generate reflected sound to a user; and (b.) driving a second set of speakers, which are integral with said computer and are not piezoelectric, to provide direct sound to said user; whereby spatial impression of said computer sound system is enhanced.

According to another disclosed class of innovative embodiments, there is provided: A method of enhancing spatial impression in a portable computer audio sound system, comprising the steps of: (a.) driving a plurality of rearward-firing piezoelectric speakers, which are integral with said computer, to project acoustic power away from the rear of a planar display, to generate reflected sound to a user; and (b.) driving a plurality of dynamic speakers, which are integral with said computer, at a fixed angle with respect to either said display or said chassis, to provide direct sound to said user; whereby spatial impression of said computer sound system is enhanced.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the disclosed concepts can also be used with audio system configurations which use more than two channels of audio source signal.

It should also be noted that the disclosed innovative ideas are also applicable to television systems.

It should also be noted that the disclosed innovative ideas are applicable to small portable audio systems such as boom boxes.

It should also be noted that the disclosed innovative ideas are applicable to systems which are capable of supporting more than two channels of audio, such as quad-channel or AC-3 sound systems.

It should also be noted that the disclosed innovative ideas are not limited only to Windows, DOS or UNIX systems, but can also be implemented in other operating systems.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

It should also be noted that the disclosed innovative ideas are not by any means limited to single-user desktop systems, but are also applicable to mainframe transaction processing systems, terminals, engineering workstations, and portable computers to which an external speaker system can be attached.

What is claimed is:

1. A portable computer system, comprising:

an input device, a microprocessor which is operatively connected to detect inputs from said input device, random-access memory which is connected to be read/write accessible by said microprocessor, an output device operatively connected to receive outputs from said microprocessor, and a display connected to display information toward a user position;

first speakers which radiate acoustic energy toward said user position; and one or more piezoelectric speakers which radiate acoustic energy away from said user position;

whereby spatial impression is enhanced.

2. The system of claim 1, wherein said piezoelectric speakers are located in the center of the back of said display.

3. The system of claim 1, wherein said piezoelectric speakers have surface dimensions of approximately three by five centimeters each.

4. The system of claim 1, wherein said first speakers are mounted in a front location of the computer chassis.

5. The system of claim 1, wherein said portable computer further comprises additional side-firing speakers which are mounted in a side location of the computer chassis.

6. The system of claim 1, wherein said first speakers, and said piezo-electric speakers can be selectively disabled by a user.

7. The system of claim 1, wherein four said piezoelectric speakers are positioned in the center of the back of said display in such a way as to direct two channels of acoustical energy in divergent paths.

8. The system of claim 1, wherein said first speakers are dynamic speakers.

9. The system of claim 1, wherein equalization is provided to said piezoelectric speakers to lower the point of low-end roll-off.

10. The system of claim 1, wherein said piezoelectric speakers radiate acoustic energy which is delayed in time with respect to energy radiated from said first speakers.

11. The system of claim 1, wherein said piezoelectric speakers radiate acoustic energy which is low-pass filtered.

12. A portable computer system, comprising:

an input device, a microprocessor which is operatively connected to detect inputs from said input device, random-access memory which is connected to be read/write accessible by said microprocessor, and an output device operatively connected to receive outputs from said microprocessor;

a movable display, operatively connected to display data generated by said microprocessor;

one or more rearward-firing piezoelectric speakers, which radiate acoustic energy toward the rear side of said display; and a plurality of forward-firing dynamic speakers which radiate acoustic energy toward the front of said display;

wherein energy generated from said rearward-firing speakers is delayed in time with respect to energy generated from said forward-firing speakers;

wherein the spectral content of said acoustic energy is predominantly below a certain frequency in order to enhance spatial impression.

13. The system of claim 12, wherein said forward-firing speakers are mounted on the front of said display.

14. The system of claim 12, wherein said piezoelectric speakers are located in the center of the back of said display.

15. The system of claim 12, wherein four said piezoelectric speakers are positioned in the center of the back of said display in such a way as to direct two channels of acoustical energy in divergent paths.

16. The system of claim 12, wherein said piezoelectric speakers have surface dimensions of approximately three by five centimeters each.

17. The system of claim 12, wherein said forward-firing speakers are mounted in a front location of the computer chassis.

18. The system of claim 12, wherein said rearward-firing speakers and said forward-firing speakers each can be selectively disabled by the user.

19. The system of claim 12, wherein four said piezoelectric speakers are positioned in the center of the back of said display in such a way as to direct acoustical energy in a direction non-perpendicular to rear reflecting horizontal or vertical surfaces.

20. The system of claim 12, wherein the frequency response of said piezoelectric speakers extends to frequencies below 500 Hz.

21. The system of claim 12, wherein said piezoelectric speakers radiate acoustic energy which is delayed in time with respect to energy radiated from forward-firing speakers.

22. A method of enhancing spatial impression in a portable computer audio sound system, comprising the steps of:
  (a.) driving a first set of rearward-firing piezoelectric speakers, which are integral with said computer, to project acoustic power away from the rear of a planar display, to generate reflected sound to a user; and
  (b.) driving a second set of speakers, which are integral with said computer and are not piezoelectric, to provide direct sound to said user;
  whereby spatial impression of said computer sound system is enhanced.

23. The method of claim 22, wherein said piezoelectric speakers are located in the center of the back of said display.

24. The method of claim 22, wherein said piezoelectric speakers have surface dimensions of approximately three by five centimeters each.

25. The method of claim 22, wherein said second set of speakers are mounted in a front location of the computer chassis.

26. The method of claim 22, wherein said first set of speakers and said second set of speakers each can be selectively disabled by a user.

27. The method of claim 22, wherein said second set of speakers are dynamic.

28. The method of claim 22, wherein said piezoelectric speakers radiate acoustic energy which is delayed in time with respect to energy radiated from forward-firing speakers.

29. A method of enhancing spatial impression in a portable computer audio sound system, comprising the steps of:
  (a.) driving a plurality of rearward-firing piezoelectric speakers, which are integral with said computer, to project acoustic power away from the rear of a planar display, to generate reflected sound to a user; and
  (b.) driving a plurality of dynamic speakers, which are integral with said computer, at a fixed angle with respect to either said display or said chassis, to provide direct sound to said user;
  whereby spatial impression of said computer sound system is enhanced.

30. The method of claim 29, wherein said piezoelectric speakers are located in the center of the back of said display.

31. The method of claim 29, wherein said forward-firing speakers are mounted in a front location of the computer chassis.

32. The method of claim 29, wherein said forward-firing speakers are mounted in a side location of the computer chassis to enhance spatial impression.

33. The method of claim 29, wherein said rearward-firing speakers and said dynamic speakers each can be selectively disabled by a user.

34. The method of claim 29, wherein the frequency response of said piezoelectric speakers extends to frequencies below 500 Hz.

35. The method of claim 29, wherein said piezoelectric speakers radiate acoustic energy which is delayed in time with respect to energy radiated from said dynamic speakers.

* * * * *